United States Patent
Adachi et al.

(10) Patent No.: US 12,196,858 B2
(45) Date of Patent: Jan. 14, 2025

(54) INFORMATION PROCESSING DEVICE, INFORMATION PROCESSING METHOD, AND STORAGE MEDIUM FOR ESTIMATING POSITION INFORMATION OF A MOVING DEVICE

(71) Applicant: Mitsubishi Electric Corporation, Tokyo (JP)

(72) Inventors: Yoshiaki Adachi, Tokyo (JP); Yuji Igarashi, Tokyo (JP); Hirozumi Yamaguchi, Osaka (JP); Teruo Higashino, Osaka (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 616 days.

(21) Appl. No.: 17/439,416

(22) PCT Filed: May 16, 2019

(86) PCT No.: PCT/JP2019/019550
§ 371 (c)(1),
(2) Date: Sep. 15, 2021

(87) PCT Pub. No.: WO2020/230325
PCT Pub. Date: Nov. 19, 2020

(65) Prior Publication Data
US 2022/0155448 A1    May 19, 2022

(51) Int. Cl.
*G01S 17/06* (2006.01)
*G01S 7/00* (2006.01)
(Continued)

(52) U.S. Cl.
CPC .............. *G01S 17/86* (2020.01); *G01S 7/003* (2013.01); *G01S 7/4808* (2013.01); *G01S 17/06* (2013.01); *G01S 17/894* (2020.01)

(58) Field of Classification Search
CPC ........ G01S 17/86; G01S 17/894; G01S 17/06; G01S 7/003; G01S 7/4808
See application file for complete search history.

(56) References Cited

U.S. PATENT DOCUMENTS 5,675,518 A     10/1997   Kuroda et al.
10,853,669 B2 *  12/2020   Mori .................... G06F 18/256
(Continued)

FOREIGN PATENT DOCUMENTS

JP     2012-115918 A     6/2012
JP     2013-257238 A    12/2013
(Continued)

OTHER PUBLICATIONS

International Search Report and Written Opinion mailed on Aug. 13, 2019, received for PCT Application PCT/JP2019/019550, Filed on May 16, 2019, 10 pages including English Translation.

*Primary Examiner* — Dino Kujundzic
(74) *Attorney, Agent, or Firm* — XSENSUS LLP

(57) ABSTRACT

The purpose of the present invention is to provide a technique for estimating position information of a moving device without it being possible for a sensor installed in the environment to observe the moving device. On the bases of first position information, which is acquired by a first moving object acquisition receiver and which is position information of one or more first moving bodies present in the periphery of a first sensor (an autonomous sensor), and second position information, which is acquired by a second moving object acquisition receiver and which is position information of one or more second moving bodies present in the periphery of a second sensor (an infrared sensor), the information processing device compares the positional relation between the first moving object and the second moving object and estimates the position information of the moving device.

18 Claims, 8 Drawing Sheets

(51) Int. Cl.
  *G01S 7/48*     (2006.01)
  *G01S 17/86*    (2020.01)
  *G01S 17/894*   (2020.01)

(56)     References Cited

U.S. PATENT DOCUMENTS

| | | | | |
|---|---|---|---|---|
| 2016/0132056 A1* | 5/2016 | Yoshino | ................ | G01S 7/4808 |
| | | | | 701/23 |
| 2017/0289526 A1* | 10/2017 | Sasatani | .................... | G06T 7/80 |
| 2018/0267142 A1* | 9/2018 | Motoyama | ............ | G01S 7/4026 |
| 2019/0049240 A1* | 2/2019 | Kawanishi | .............. | G01S 17/89 |
| 2022/0206103 A1* | 6/2022 | Takeuchi | .............. | G01S 5/0278 |

FOREIGN PATENT DOCUMENTS

| JP | 2016-152003 A | 8/2016 |
|---|---|---|
| JP | 2018-97710 A | 6/2018 |

\* cited by examiner

INFORMATION PROCESSING DEVICE, INFORMATION PROCESSING METHOD, AND STORAGE MEDIUM FOR ESTIMATING POSITION INFORMATION OF A MOVING DEVICE

CROSS-REFERENCE TO RELATED APPLICATION

The present application is based on PCT filing PCT/JP2019/019550, filed May 16, 2019, the entire contents of which are incorporated herein by reference.

TECHNICAL FIELD

The present invention relates to an information processing device for estimating position information of a moving device, an information processing method, and a computer-readable storage medium.

BACKGROUND ART

In order to move a moving device such as a robot or mobility from one point to another, real time estimation of the current position of the moving device is required. Therefore, a technique for estimating the current position of the moving device has been proposed. For example, Patent Document 1 proposes a technique for real time estimation of a position of a moving device, which is performed by comparing trajectories of the moving device obtained from a time series of position information of the moving device estimated based on a sensor mounted on the moving device and a time series of position information of the moving device estimated based on a sensor installed in environment.

PRIOR ART DOCUMENTS

Patent Documents

[Patent Document 1] Japanese Patent Application Laid-Open No. 2012-115918

SUMMARY

Problem to be Solved by the Invention

However, in the technique described in Patent Document 1, there has been a problem in which the position of the moving device cannot be estimated correctly, as in a case where the moving device cannot be observed from the sensor installed in the environment, such as a case where there are many moving objects or obstacles other than the moving device.

The present invention has been made in view of the above problem and has an object to provide a technique capable of estimating the position information of the moving device even when the sensor installed in the environment cannot observe the moving device.

Means to Solve the Problem

According to the present invention, an information processing device configured to estimate position information of a moving device includes a first moving object acquisition unit configured to acquire first position information being relative position information of the moving device and one or more first moving objects present around a first sensor based on observation information generated by the first sensor mounted on the moving device, a second moving object acquisition unit configured to acquire second position information being position information of one or more second moving objects present around a second sensor based on observation information generated by the second sensor provided outside of the moving device, and a position estimation unit configured to estimate position information of the moving device by comparing positional relationships of the first moving object and the second moving object based on the first position information acquired by the first moving object acquisition unit and the second position information acquired by the second moving object acquisition unit.

Effects of the Invention

According to the present invention, based on the first position information acquired by the first moving object acquisition unit and the second position information acquired by the second moving object acquisition unit, the position information of the moving device is estimated by comparing the positional relationships of the first moving object and the second moving object. According to such a configuration, the position information of the moving device can be estimated even when a sensor installed in the environment cannot observe the moving device.

The objects, features, aspects, and advantages of the present invention will become more apparent from the following detailed description and the accompanying drawings.

DESCRIPTION OF EMBODIMENT(S)

Embodiment 1

Figure 1:
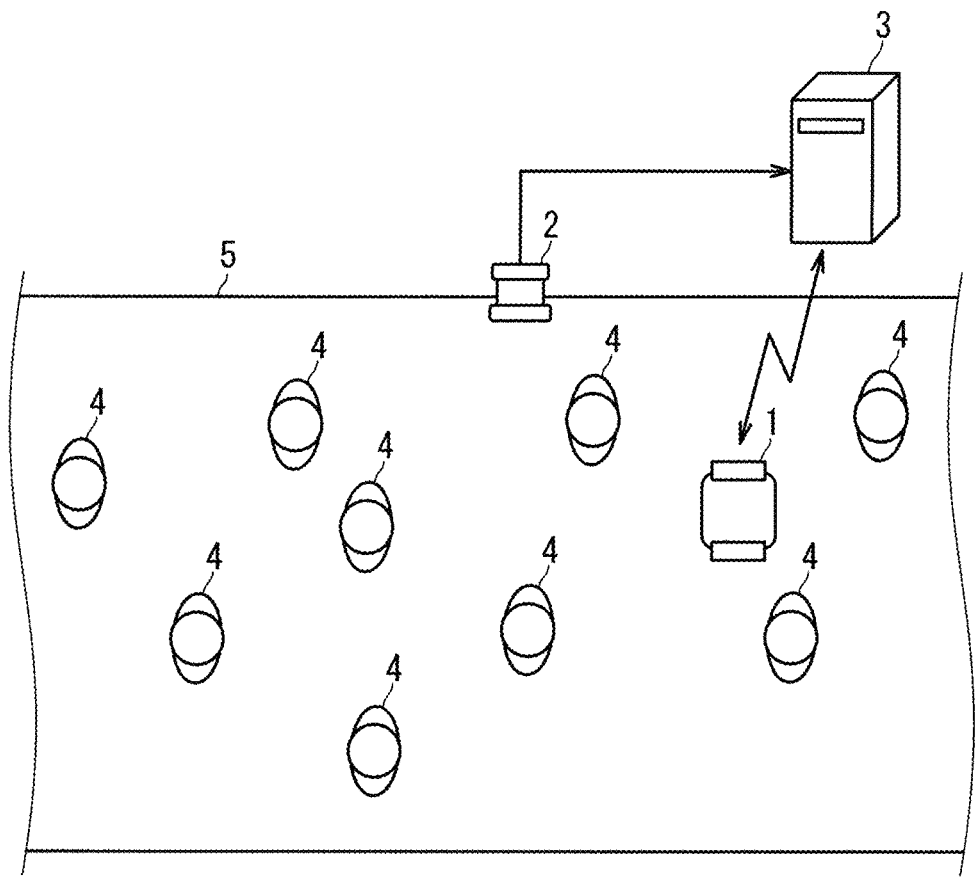
FIG. 1 A conceptual diagram illustrating an example of a system configuration according to Embodiment 1.

Hereinafter, Embodiment 1 of the present invention will be described with reference to the drawings. FIG. 1 is a conceptual diagram illustrating an example of a system configuration according to Embodiment 1.

The system according to Embodiment 1 includes a moving device 1 being a target of which position information is estimated, an infrastructure sensor 2 that observes a moving object including the moving device 1, and an information processing device 3 that acquires observation information from the moving device 1 and the infrastructure sensor 2 and estimates position information of the moving device 1. Further, FIG. 1 illustrates the moving objects 4 other than the moving device 1 and a space 5 in which the moving device 1 and the moving objects 4 move. As examples of the moving objects 4, persons' heads and shoulders are illustrated therein.

Here, the position information is information indicating places where features such as the moving device 1, the infrastructure sensor 2, or the moving objects 4 present. The position information may be absolute information that uniquely represents a place in space 5, or may be, for example, relative position information that represents a positional relationship between features.

Further, representation with a point such as mass points may be adopted, or representation with a region having an area may also be adopted as an expression format of the position information. In addition, a latitude/longitude format, an orthogonal coordinate format with a certain point as the origin, or a polar coordinate format with a certain point as the origin may also be adopted as the expression format of the position information, for example. Further, the position information may include information indicating a direction. The information indicating a direction may be, for example, an azimuth angle based on the north direction.

The observation information is information generated by sensors such as the autonomous sensor 11 (FIG. 2) mounted on the moving device 1 and the infrastructure sensor 2 to estimate the position information of the moving objects present around the sensor. The moving objects referred to here may include only the moving objects 4, or may include the moving device 1 and the moving objects 4.

As the observation information, for example, two parallax images may be adopted when the sensor is a stereoscopic camera, a set of points having distance and azimuth information may be adopted when the sensor is an Laser Range Finder (LRF), or a set of pixels having a distance may be adopted when the sensor is a Time of Flight (ToF) camera. Further, the observation information need only include information with which to estimate a distance between the sensor and a moving object present around the sensor, and may also include information other than the information. Further, the observation information may be a raw value acquired by the sensor, or may be a processed value after some processing is performed on the raw value.

<Moving Device 1>

Figure 2:
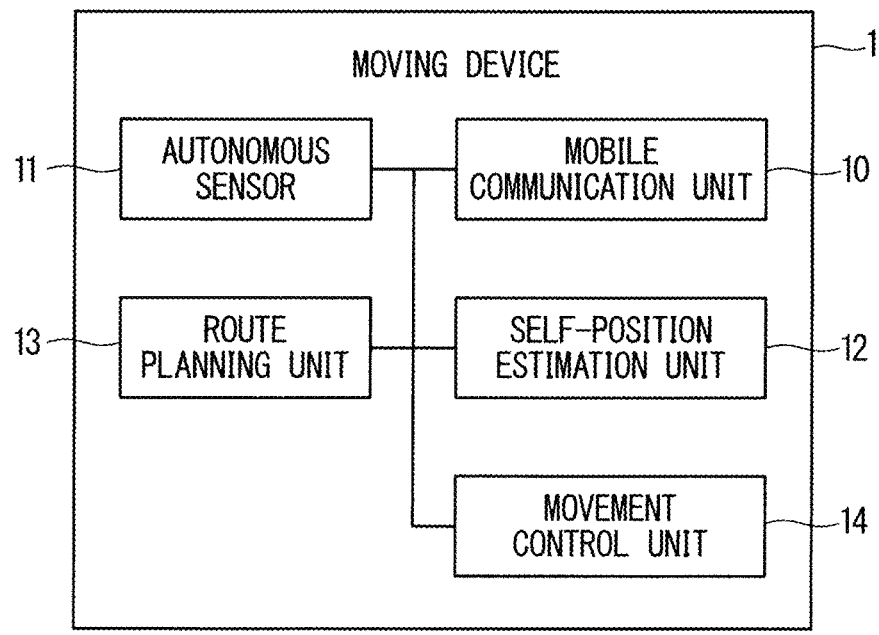
FIG. 2 A block diagram illustrating a configuration and functions of a moving device according to Embodiment 1.

The configuration of the moving device 1 according to Embodiment 1 will be described with reference to FIG. 2. FIG. 2 is a block diagram illustrating the configuration and functions of the moving device 1.

The moving device 1 is a device that moves in the space 5, and the position information of the moving device 1 is estimated by the information processing device 3. The moving device 1 is, for example, a robot, mobility, an electric wheelchair, an electric dolly, an autonomous driving vehicle, or the like. The number of the moving devices 1 may be one or a plurality thereof may be acceptable.

The moving device 1 of FIG. 2 includes a mobile communication unit 10 for communicating with the information processing device 3, and the autonomous sensor 11 that generates observation information by observing the vicinity of the moving device 1.

Further, in addition to the above, a self-position estimation unit 12, a route planning unit 13, and a movement control unit 14 may be provided so that the moving device 1 can autonomously move. Details of the above will be described later, and an outline of the above will be described here. The self-position estimation unit 12 estimates the position of the moving device 1 using the autonomous sensor 11 and generates position information representing the position. The route planning unit 13 calculates a route to a destination and generates route information representing the route. The movement control unit 14 performs movement control for moving the moving device 1 to the destination based on the position information and the route information.

Next, the components of the moving device 1 will be described in detail.

The mobile communication unit 10 is a communication unit for communicating the observation information generated by the autonomous sensor 11 and the position information estimated by the information processing device 3 with the information processing device 3. The mobile communication unit 10 periodically transmits the observation information generated by the autonomous sensor 11 to the information processing device 3, and receives the position information estimated by the information processing device 3 from the information processing device 3.

Further, the mobile communication unit 10 may also transmit and receive information other than the above information. For example, the mobile communication unit 10 may transmit the position information estimated by the self-position estimation unit 12 to the information processing device 3, or transmit the route information planned by the route planning unit 13 to the information processing device 3.

Further, a communication method of the mobile communication unit 10 may be any communication method capable of exchanging information with the information processing device 3 while the moving device 1 is on the move. For example, as the communication method, narrow-range radio communication such as wireless Local Area Network (LAN) or Bluetooth (registered trademark), wide-area radio communication such as Long Term Evolution (LTE), or World Interoperability For Microwave Access (WiMAX), optical communication such as the visible light communication standard method, or sound wave communication may be adoptable.

The autonomous sensor 11 is a sensor mounted on the moving device 1, which observes moving objects around the moving device 1 and thus around the autonomous sensor 11 and outputs the result as the observation information. The autonomous sensor 11 corresponds to a first sensor in the information processing device 3. Moving objects observed by the autonomous sensor 11 are, for example, one or more moving objects 4 in FIG. 1. The autonomous sensor 11 may be, for example, a stereoscopic camera, a Laser Range Finder (LRF), or a Time of Flight (ToF) camera. Further, a single autonomous sensor 11 may be mounted on the moving device 1, or a plurality of autonomous sensors 11 may be mounted on the moving device 1.

Further, the autonomous sensor 11 may include not only a sensor used for estimating a position of a moving object around the moving device 1 but also a sensor used for the self-position estimation unit 12 and the movement control unit 14. The sensor used for the self-position estimation unit 12 and the movement control unit 14 may be, for example, a wheel encoder, a gyro sensor, an obstacle sonar, or the like.

The self-position estimation unit 12 is a processing unit that performs real time estimation by the moving device 1 alone for the current position and the azimuth of the moving device 1 when the mobile communication unit 10 cannot receive the position information from the information processing device 3, by using the observation information generated by the autonomous sensor 11 or map information of area in which the moving device 1 travels. The position estimation method of the self-position estimation unit 12 may be, for example, dead reckoning using a wheel encoder or a gyro, Self-Localization and Mapping (SLAM) using an LRF or the map information, or the like.

The route planning unit 13 is a processing unit that calculates the route from the current position represented by the position information to the destination based on the position information estimated by the self-position estimation unit 12 and the map information of the area in which the moving device 1 travels, and generates the route information representing the route.

The movement control unit 14 is a drive control unit that controls, for example, a battery, a motor, wheels, and the like provided in the moving device 1 to move the moving device 1 from the current position to the destination while avoiding obstacles based on the position information and the route information representing the current position of the moving device 1. For example, the movement control unit 14 calculates a movement amount and a movement direction for the moving device 1 to be moved based on the position information and the route information so that the moving device 1 can avoid the obstacles detected by the autonomous sensor 11. Then, the movement control unit 14 controls the moving device 1 to avoid the obstacles by controlling the rotation of the motor of the moving device 1 based on the calculated movement amount and the movement direction.

<Infrastructure Sensor 2>

An infrastructure sensor 2 according to Embodiment 1 will be described with reference to FIG. 1.

The infrastructure sensor 2 is provided outside the moving device 1. The infrastructure sensor 2 is a sensor that is fixed as an infrastructure element such as a structure or equipment outside the moving device 1, observes the moving objects present around the infrastructure sensor 2, and outputs the result as observation information. The infrastructure sensor 2 corresponds to a second sensor in the information processing device 3. The moving objects observed by the infrastructure sensor 2 are, for example, at least one of the moving device 1 and one or more moving objects 4 in FIG. 1.

The infrastructure sensor 2 periodically transmits the observation information to the information processing device 3. The components of the infrastructure sensor 2 may be the same as that of the autonomous sensor 11, for example. Further, a single infrastructure sensor 2 may be installed in the space 5, or a plurality of infrastructure sensors 2 may be installed the same. In addition, the infrastructure sensor 2 may be connected to the information processing device 3 by wire or wirelessly.

Further, the infrastructure sensor 2 need only be installed at a position from which it can observe the moving objects, and may be installed on, for example, a ceiling, a wall, or a pillar. In addition, the infrastructure sensor 2 may be installed so that the sensing range of the infrastructure sensor 2 can be the entire range of the space 5 or the sensing range of the infrastructure sensor 2 can be a range of portion of which position information of the moving device 1 is to be estimated in the space 5.

<Information Processing Device 3>

Figure 3:
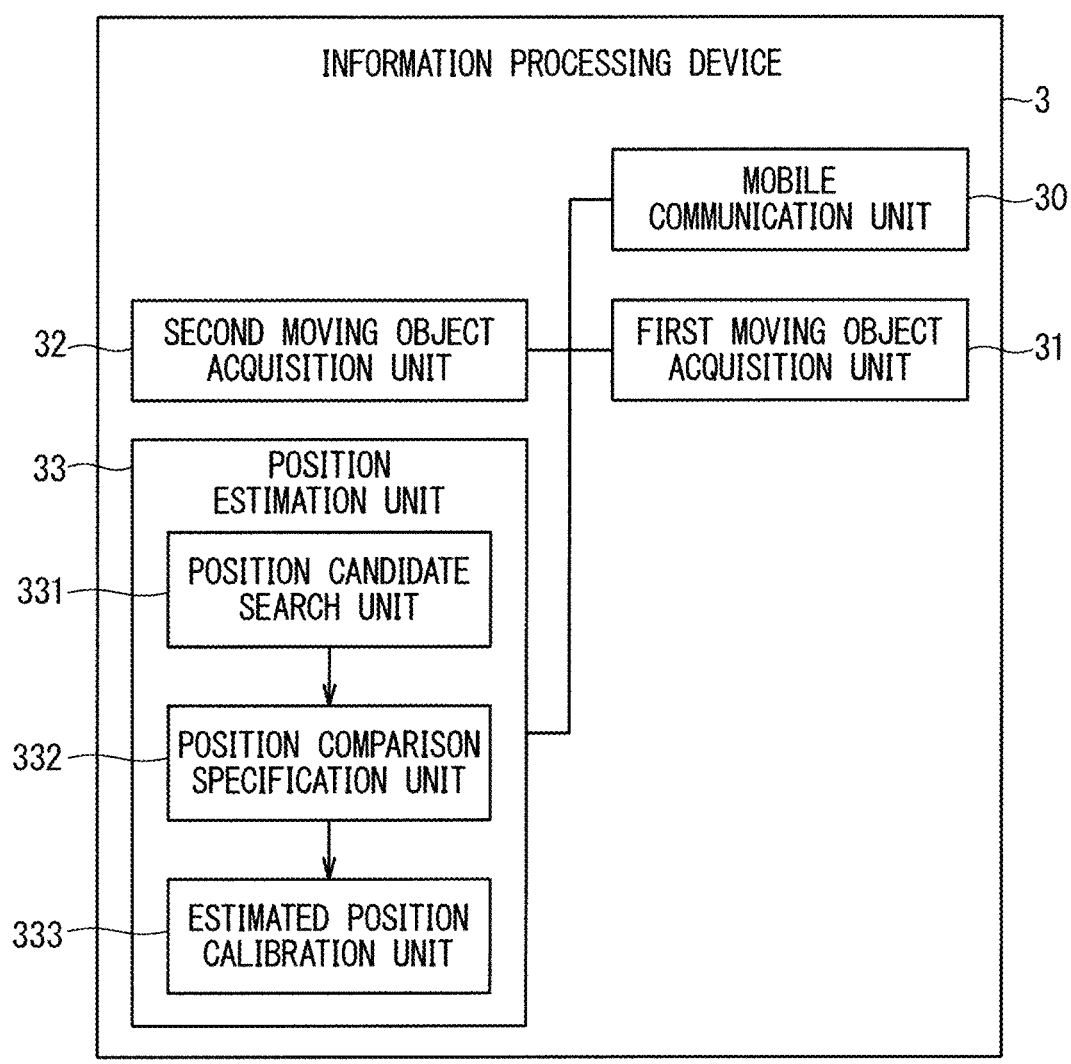
FIG. 3 A block diagram illustrating a configuration and functions of an information processing device according to Embodiment 1.

The configuration of the information processing device 3 according to Embodiment 1 will be described with reference to FIG. 3. FIG. 3 is a block diagram illustrating the configuration and functions of the information processing device 3.

The information processing device 3 includes a mobile communication unit 30, a first moving object acquisition unit 31, a second moving object acquisition unit 32, and a position estimation unit 33. Details of the above will be described later, and an outline of the above will be described here.

The mobile communication unit 30 communicates with the moving device 1 and receives observation information generated by the autonomous sensor 11 mounted on the moving device 1.

The first moving object acquisition unit 31 estimates and acquires first position information being relative position information of the moving device 1 and one or more first moving objects present around the autonomous sensor 11 based on the observation information received by the mobile communication unit 30, that is, the observation information generated by the autonomous sensor 11 mounted on the moving device 1. The first moving objects here, for example, are represented by one or more moving objects 4 in FIG. 1.

The second moving object acquisition unit 32 estimates and acquires second position information being position information of one or more second moving objects present around the infrastructure sensor 2 based on the observation information generated by the infrastructure sensor 2 provided outside the moving device 1. The second moving objects here, for example, are represented by at least one of the moving device 1 and the moving objects 4 in FIG. 1. The second position information may be absolute position information of the second moving object, or may be relative position information of the infrastructure sensor 2 and the second moving object.

Based on the first position information estimated by the first moving object acquisition unit 31 and the second position information estimated by the second moving object acquisition unit 32, the position estimation unit 33 estimates the position information of the moving device 1 by comparing the positional relationships of the first moving object and the second moving object.

The information processing device 3 is a calculator including a storage device that temporarily stores each unit as a program, a Central Processing Unit (CPU) for executing each unit, a memory that holds a result calculated by the CPU and the program executed by the CPU, and an interface for communicating with the moving device 1 and the infrastructure sensor 2. The program stored in the memory includes a program that makes the information processing apparatus 3 to execute functions of the first moving object acquisition unit 31, the second moving object acquisition unit 32, and the position estimation unit 33, and the like.

In addition, the information processing device 3 grasps the position information of the infrastructure sensor 2. For example, the information processing device 3 may grasp known position information of the infrastructure sensor 2 with the information processing device 3 holding an installation position file in which the position information of the infrastructure sensor 2 is described. Alternatively, with the information regarding the installation of the infrastructure sensor 2 being held inside thereof, the information processing device 3 may grasp the known position information of the infrastructure sensor 2 by the infrastructure sensor 2 transmitting the position information together with the observation information to the information processing device 3.

Next, the components of the information processing device 3 will be described in detail.

The mobile communication unit 30 is a communication unit for communicating observation information and position information with the moving device 1. The mobile communication unit 30 periodically receives the observation information generated by the autonomous sensor 11 from the moving device 1, and transmits the position information estimated by the information processing device 3 to the moving device 1. It should be noted that, the mobile communication unit 30 may also transmit and receive information other than the above information. Further, the communication method of the mobile communication unit 30 may also be the same as that of the mobile communication unit 10, for example.

The first moving object acquisition unit 31 is a processing unit that detects one or more first moving objects present around the autonomous sensor 11 and thus around the moving device 1 and estimates relative positions of the first moving objects with respect to the moving device 1 based on the observation information generated by the autonomous sensor 11 and received by the mobile communication unit 30. And, the first moving object acquisition unit 31 is a processing unit that generates position information representing its estimation result, that is, first position information regarding the positions of one or more first moving objects present around the moving device 1.

The first position information generated by the first moving object acquisition unit 31 represents the relative positional relationship between the moving device 1 and the first moving objects around the moving device 1. The first position information may be represented by, for example, a distance and an azimuth having the moving device 1 as the origin, or may be represented by two-dimensional coordinates having the moving device 1 as the origin.

Next, an example of a method of generating the first position information in the first moving object acquisition unit 31 will be described. In this example, a two-dimensional LRF is assumed as the autonomous sensor 11, and a set of observation points having information on a distance and an angle having the moving device 1 as the origin is assumed as the observation information generated by the autonomous sensor 11.

First, when the first moving object acquisition unit 31 receives the observation information observed by the autonomous sensor 11, the observation points are clustered based on the distance and angle of the observation points, and one or more clusters are generated.

Next, based on the number of observation points, the distance of a series of the observation points, the distance from the two-dimensional LRF, and the like, the first moving object acquisition unit 31 performs filtering for each cluster, thereby extracting, from among one or more clusters, a cluster from which the position of the first moving object may possibly be accurately estimated.

Next, the first moving object acquisition unit 31 calculates, for extracted each cluster, the position of each cluster based on the included observation points. The position to be calculated may be the central position of the cluster or the region where the first moving object is presumed to be present.

Finally, the first moving object acquisition unit 31 generates the first position information of the first moving object by setting the calculated position of one cluster as the position of one first moving object.

The second moving object acquisition unit 32 is a processing unit that detects one or more second moving objects present around the infrastructure sensor 2 based on the observation information generated by the infra sensor 2, and estimates absolute positions of the second moving objects. And, the second moving object acquisition unit 32 is a processing unit that generates position information representing its estimation result, that is, second position information regarding the positions of one or more second moving objects present around the infrastructure sensor 2.

The second position information generated by the second moving object acquisition unit 32 does not necessarily have to be absolute position information. For example, like the relative position information of the second moving object to the infrastructure sensor 2, the second position information need only be such position information that is convertible into the absolute position information of the second moving object by using the position information of the infrastructure sensor 2. Further, the method of estimating the second position information in the second moving object acquisition unit 32 may be the same as, for example, the first moving object acquisition unit 31.

The position estimation unit 33 is a processing unit that estimates and generates the position information representing at least one of the position or the azimuth of the moving device 1 by superposing the positional relationship of the first moving object and the positional relationship of the second moving object based on the first position information estimated by the first moving object acquisition unit 31 and the second position information estimated by the second moving object acquisition unit 32, and by performing a shielding determination. In the shielding determination here, a determination is performed on whether or not the first moving object is shielded with the second moving object with respect to the autonomous sensor 11, or on whether the second moving object is shielded with the first moving object with respect to the infrastructure sensor 2.

The position estimation unit 33 illustrated in FIG. 3 includes a position candidate search unit 331 and a position comparison specification unit 332. Further, the position estimation unit 33 may include an estimated position calibration unit 333. Details of the above will be described later, and an outline of the above will be described here.

Based on the first position information estimated by the first moving object acquisition unit 31 and the second position information estimated by the second moving object acquisition unit 32, the position candidate search unit 331 searches for one or more candidates regarding to the position information of the moving device 1.

When one or more candidates are searched by the position candidate search unit 331, the position comparison specification unit 332 performs the above-mentioned shielding determination for each candidate searched by the position candidate search unit 331, and specifies a candidate from one or more candidates based on the result of the shielding determination.

When the position of any one of the second moving objects represented by the second position information and the position represented by the position information of the moving device 1 specified by the position comparison specification unit 332 correspond to each other, the estimated position calibration unit 333 calibrates the position information of the moving device 1 using the position of the one second moving object.

Next, the components of the position estimation unit 33 will be described in detail.

The position candidate search unit 331 searches for one or more candidates regarding the position information of the moving device 1 by superimposing the positional relationship of the first moving object and the positional relationship of the second moving object based on the first position information and the second position information, while keeping the relative positional relationship between the first moving object and the second moving object as much as possible.

Hereinafter, an example of a candidate search process in the position candidate search unit 331 will be described. In the example, a moving object group A represents one or more first moving objects, and a moving object group X represents one or more second moving objects. Further, in the example, it is assumed that each position of the moving object group A is represented by a relative coordinate system with the moving device 1 as the origin, and each position of the moving object group X is represented by an absolute coordinate system.

First, the position candidate search unit 331 selects two or more first moving objects and two or more second moving objects from the moving object group A and the moving object group X, respectively, and generates two or more sets each consists of one first moving object and one second moving object. In the example, it is assumed that the position candidate search unit 331 selects two first moving objects A1 and A2 and two second moving objects X1 and X2 from the moving object group A and the moving object group X, respectively. Then, the position candidate search unit 331 sets a set consisting of the first moving object A1 and the second moving object X1 as a set AX1, and a set consisting of the first moving object A2 and the second moving object X2 as a set AX2.

Next, the position candidate search unit 331 performs a rotation operation and a translation operation for the moving object group A such that a distance DAX1 between the moving objects of the set AX1, a distance DAX2 between the moving objects of the set AX2, or the sum of the distances is minimized. For example, the position candidate search unit 331 may determine a rotation operation amount and a translation operation amount by using the error least squares method or the like. When using a set of two moving objects, the number of candidates for the position information of the moving device 1 may be two.

At this point, based on the rotation operation amount and the translation operation amount with respect to the moving object group A, the position candidate search unit 331 calculates at least one of the position and the azimuth of the moving device 1 in the absolute coordinate system.

Next, the position candidate search unit 331 determines whether or not the distance DAX1, the distance DAX2, or the sum of the distances calculated above is within a preset threshold value. Then, when determined that the distance DAX1, the distance DAX2, or the sum of the distances is within the threshold value, the position candidate search unit 331 determines at least one of the above position and azimuth as a candidate for the position information of the moving device 1.

Finally, the position candidate search unit 331 obtains one or more candidates for the position information of the moving device 1 by performing the above process a plurality of times with the selection of the moving objects or sets of moving objects being changed. It should be noted that sets are not required to be generated for all the first moving objects and the second moving objects, and there may be the first moving objects and the second moving objects that are not put into sets.

When no position information candidate for the moving device 1 is generated, the position candidate search unit 331 may determine that the moving device 1 is not present in the observation range of the infrastructure sensor 2 or the moving device 1 is not recognized.

Also, the position candidate search unit 331 may store the last estimated position information of the moving device 1 and use the last estimated position information to generate a candidate for the position information to be estimated this time. Alternatively, in a case when the moving device 1 includes the self-position estimation unit 12, the position candidate search unit 331 may use the position information generated by the moving device 1 to generate a candidate for the position information. In such cases, for example, a limit may be provided on the amount of movement of the rotation operation and the translation operation.

Further, the position candidate search unit 331 may store map information including shapes of structures such as buildings, and use the map information to generate a candidate for the position information. For example, the position candidate search unit 331 may not determine the position information representing the position of the moving device 1 as the above candidate when the position of the moving device 1 after a moving operation is not consistent with the position of a structure in the map information.

The position comparison specification unit 332 is a processing unit that performs the above shielding determination by estimating an observation region for the autonomous sensor 11 with the observation shielding being taken into consideration and an observation region of the infrastructure sensor 2 with the observation shielding being taken into consideration, determining the presence or absence of moving objects to be observed by each other's sensors, and specifies a candidate from one or more candidates based on the result of the shielding determination.

Here, the observation shielding is a phenomenon in which a moving object close to one sensor of the autonomous sensor 11 and the infrastructure sensor 2 shields a moving object far from the one sensor, thereby one sensor cannot observe an object far from the one sensor. Further, the observation region of the autonomous sensor 11 with the observation shielding being taken into consideration indicates a region in which no observation shielding happens in the observation range of the autonomous sensor 11, and the observation region of the infrastructure sensor 2 with the observation shielding being taken into consideration indicates a region in which no observation shielding happens in the observation range of the infrastructure sensor 2.

In other words, the observation region with the observation shielding being taken into consideration indicates a region in which, for one sensor of the autonomous sensor 11 and the infrastructure sensor 2, a moving object whose position information has been acquired by the one sensor is not shielded with another moving object whose position information has been acquired by the one sensor. For example, based on the observation information of the one of the sensors, the position comparison specification unit 332 may estimate a space from the position of the one of the sensors to the position separated by the distance indicated by the observation value as an observation region with the observation shielding being taken into consideration. For example, based on the detection result of the moving object, the position comparison specification unit 332 may estimate a space from the position of the one sensor to the position of the moving object detected by the one sensor as an observation region with the observation shielding being taken into consideration.

The position comparison specification unit 332 determines whether or not a moving object whose position information has been acquired by the one sensor of the autonomous sensor 11 and the infrastructure sensor 2 is present in the observation region with the observation shielding being taken into consideration of the other sensor of the autonomous sensor 11 and the infrastructure sensor 2. For example, based on the position of the moving object represented by the position information of a certain candidate, the position comparison specification unit 332 determines whether a second moving object is present in the observation region of the autonomous sensor 11 with the observation shielding being taken into consideration, or determines whether a first moving object is present in the observation region of the infrastructure sensor 2 with the observation shielding being taken into consideration. The above-mentioned shielding determination is thus performed by the determination described above.

In Embodiment 1, when determined that a second moving object is present in the observation region of the autonomous sensor 11 or when determined that a first moving object is present in the observation region of the infrastructure sensor 2 in the shielding determination for the position information of a certain candidate, the position comparison specification unit 332 specifies the candidate from one or more candidates by excluding the candidate. It should be noted that, when two or more candidates are left or when no candidate is left as a result of such a candidate specification process, the position comparison specification unit 332 may determine that the position information of the moving device 1 has not been specified, that is, at least one of the position and the azimuth has not been specified. The shielding determination and the specification of the candidate in the position comparison specification unit 332 will be described in detail later.

As described above, the second moving objects are represented by at least one of the moving device 1 and the moving objects 4 in FIG. 1, for example, and a second moving object is the moving device 1 per se in some cases. The estimated position calibration unit 333 is a processing unit provided in view of such a case. And when determined that the position of any one of the second moving objects represented by the second position information corresponding to the observation result of the infrastructure sensor 2 corresponds to the position represented by the position information of the moving device 1 specified by the position comparison specification unit 332, the estimated position calibration unit 333 is a processing unit that calibrates the position information of the moving device 1 using the position of the one second moving object.

For example, when the distance between the position represented by the position information of the moving device 1 specified by the position comparison specification unit 332 and the position of any one of the second moving objects represented by the second position information is equal to or less than a predetermined threshold value, the estimated position calibration unit 333 may determine that these positions correspond to each other. Alternatively, the estimated position calibration unit 333 may also, for example, perform such a determination by acquiring shape information from the moving device 1 and matching the information with the observation information generated by the infrastructure sensor 2.

Next, an operation example of the position candidate search unit 331 and the position comparison specification unit 332 will be described with reference to FIGS. 1 and 4 to 9.

Figure 4:
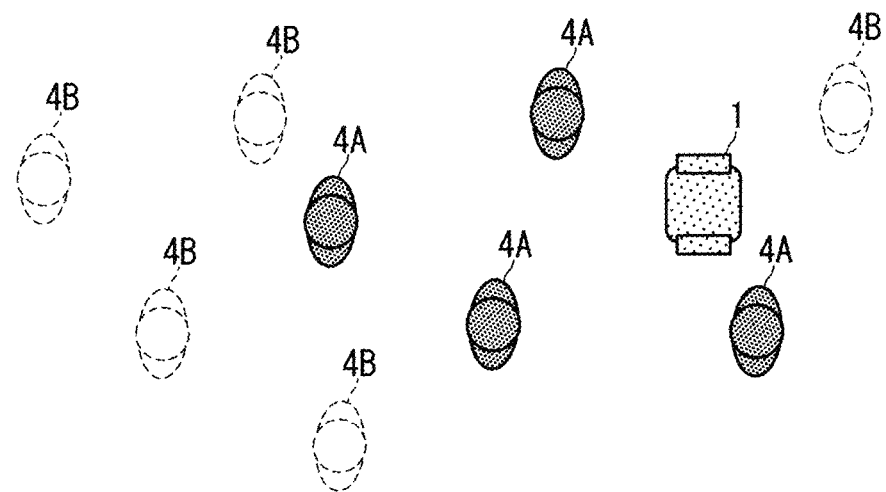
FIG. 4 A diagram illustrating an operation example of the information processing device according to Embodiment 1.

FIG. 4 is a diagram illustrating the first moving objects observed by the autonomous sensor 11 in the state of FIG. 1, and is a diagram in which the first moving objects 4A observed by the autonomous sensor 11 and the first moving objects 4B not observed by the autonomous sensor 11 due to the observation shielding or presence thereof being outside of the observation range of the sensor or the like, are illustrated.

Figure 5:
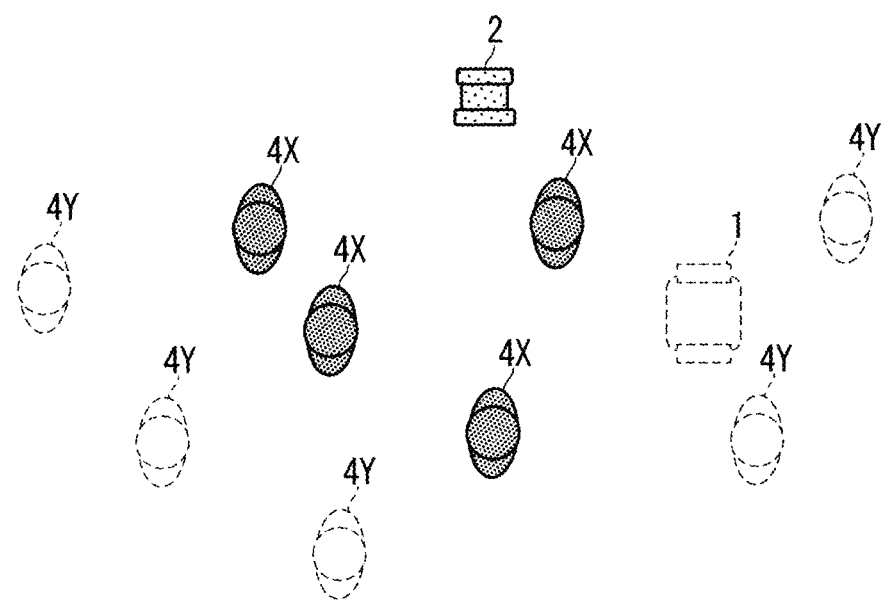
FIG. 5 A diagram illustrating an operation example of the information processing device according to Embodiment 1.

FIG. 5 is a diagram illustrating the second moving objects observed by the infrastructure sensor 2 in the state of FIG. 1, and is a diagram in which the second moving objects 4X observed by the infrastructure sensor 2 and the second moving objects 4Y not observed by the infrastructure sensor 2 due to the observation shielding or presence thereof being outside of the observation range of the sensor or the like, are illustrated.

Figure 6:
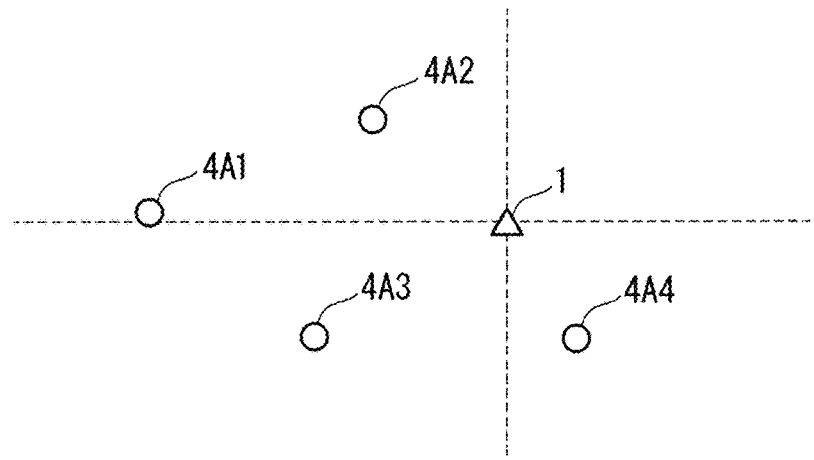
FIG. 6 A diagram illustrating an operation example of the information processing device according to Embodiment 1.

First, the first moving object acquisition unit 31 estimates the first position information of one or more first moving objects based on the observation information generated by the autonomous sensor 11. FIG. 6 illustrates the positions 4A1, 4A2, 4A3, and 4A4 of the first moving objects represented by the first position information estimated by the first moving object acquisition unit 31 in the state of FIG. 4.

Figure 7:
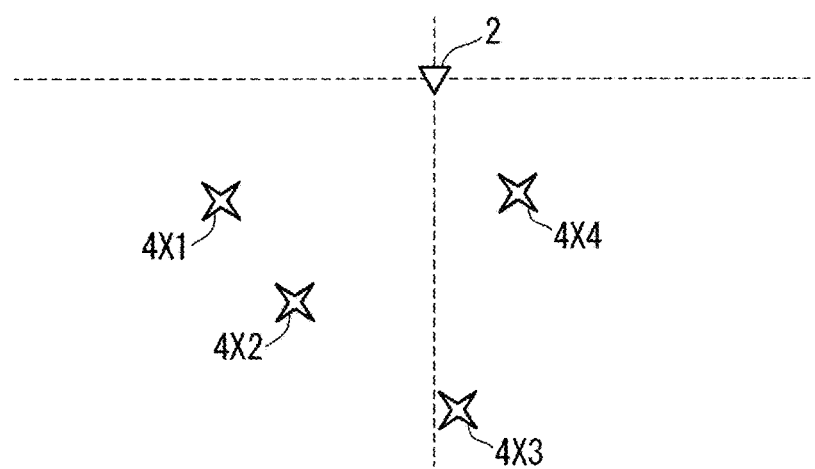
FIG. 7 A diagram illustrating an operation example of the information processing device according to Embodiment 1.

Similarly, the second moving object acquisition unit 32 estimates the second position information of one or more second moving objects based on the observation information generated by the infrastructure sensor 2. FIG. 7 illustrates the positions 4X1, 4X2, 4X3, and 4X4 of the second moving objects represented by the second position information estimated by the second moving object acquisition unit 32 in the state of FIG. 5.

Next, in the states of FIGS. 6 and 7, the position candidate search unit 331 superimposes the positional relationship of FIG. 6 and the positional relationship of FIG. 7 to generate one or more candidates regarding the positional information of the moving device 1.

Figure 8:
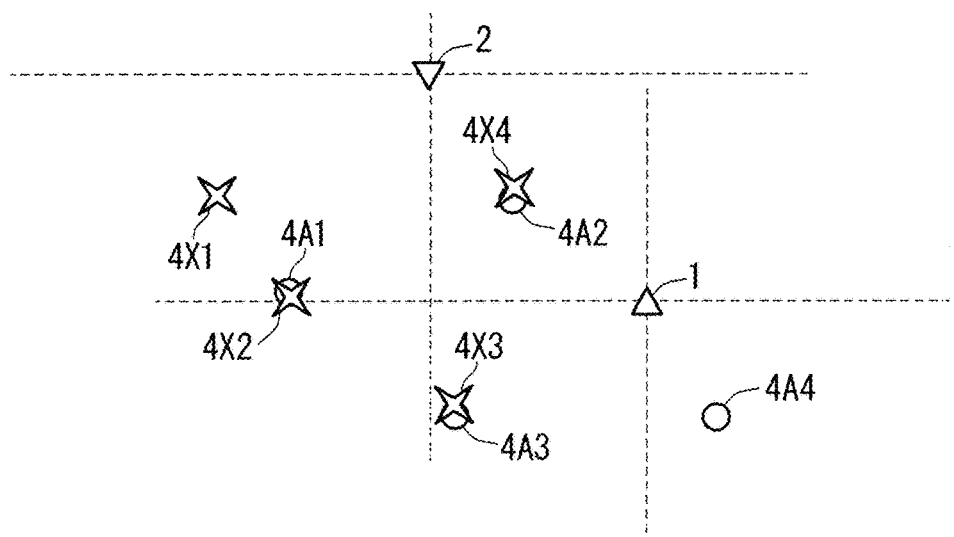
FIG. 8 A diagram illustrating an operation example of the information processing device according to Embodiment 1.
Figure 9:
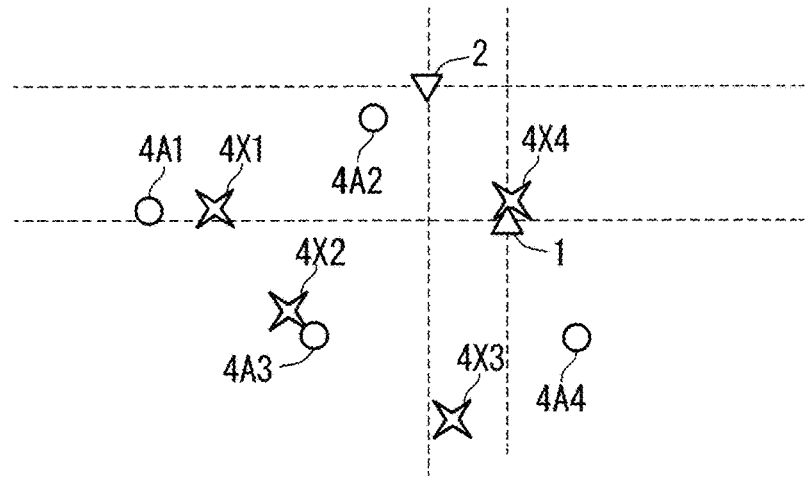
FIG. 9 A diagram illustrating an operation example of the information processing device according to Embodiment 1.

FIGS. 8 and 9, respectively, are diagrams illustrating candidates for position information of the moving device 1 generated by the position candidate search unit 331 in the states of FIGS. 6 and 7. For the states of FIGS. 6 and 7, two candidates for the position information of the moving device 1 are generated.

In terms of the candidates illustrated in FIG. 8, the positions 4A1, 4A2, and 4A3 of the first moving objects correspond to the positions 4X2, 4X4, and 4X3 of the second moving objects, respectively. In terms of the candidates illustrated in FIG. 9, the positions 4A1 and 4A3 of the first moving objects correspond to the positions 4X1 and 4X2 of the second moving objects, respectively, and the position of the moving device 1 corresponds to the position 4X4 of the second moving object.

After the candidates are generated by the position candidate search unit 331, the position comparison specification unit 332 estimates the observation region of the autonomous sensor 11 with the observation shielding being taken into consideration and the observation region of the infrastructure sensor 2 with the observation shielding being taken into consideration, and specifies the candidate from the candidates that have been generated.

Figure 10:
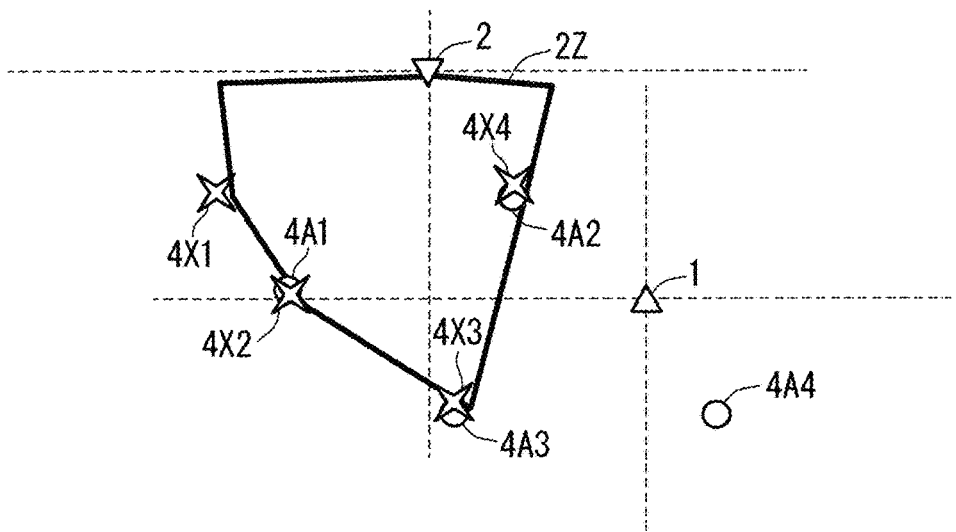
FIG. 10 A diagram illustrating an operation example of the information processing device according to Embodiment 1.
Figure 11:
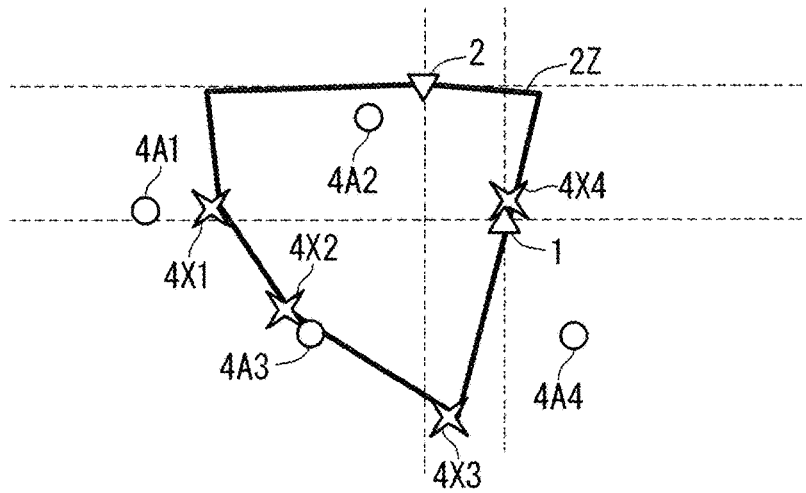
FIG. 11 A diagram illustrating an operation example of the information processing device according to Embodiment 1.

FIG. 10 is a diagram illustrating, for the candidates illustrated in FIG. 8, the observation region 2Z of the infrastructure sensor 2 with the observation shielding being taken into consideration, the position 4A4 of the first moving object corresponding to none, the position 4X1 of the second moving object corresponding to none, and the like. FIG. 11 is a diagram illustrating, for the candidates illustrated in FIG. 9, the observation region 2Z of the infrastructure sensor 2 with the observation shielding being taken into consideration, the position 4A2 of the first moving object corresponding to none, the position 4X3 of the second moving object corresponding to none, and the like.

In the examples of FIGS. 10 and 11, the position comparison specification unit 332 estimates the observation region 2Z of the infrastructure sensor 2 with the observation shielding being taken into consideration based on the position of the infrastructure sensor 2, the distance indicated by the observation value of the infrastructure sensor 2, and the positions 4X1, 4X2, 4 X3, and 4X4 of the second moving objects detected by the infrastructure sensor 2. The observation region of the autonomous sensor 11 with the observation shielding being taken into consideration is omitted in FIGS. 10 and 11 for simplicity.

Hereinafter, the shielding determination of the position comparison specification unit 332 for the candidates of FIGS. 10 and 11 will be described. The first moving object with the position 4A4 corresponding to none in FIG. 10 is a moving object that has been detected by the autonomous sensor 11 but not by the infrastructure sensor 2. Similarly, the first moving object with the position 4A2 corresponding to none in FIG. 11 is a moving object that has been detected by the autonomous sensor 11 but not by the infrastructure sensor 2.

When the position 4A4 of the first moving object, which has not been detected as a second moving object by the infrastructure sensor 2, is present outside the observation region 2Z of the infrastructure sensor 2 where no observation shielding happens as illustrated in FIG. 10, there is compatibility in such a state. However, when the position 4A2 of the first moving object, which has not been detected as a second moving object by the infrastructure sensor 2, is present inside the observation region 2Z of the infrastructure sensor 2 where no observation shielding happens as illustrated in FIG. 11, there is no compatibility in such a state; therefore, it is incompatible.

In view of the above, the position comparison specification unit 332 determines for each candidate whether or not the position of the first moving object is present outside the observation region 2Z of the infrastructure sensor 2 with the observation shielding being taken into consideration. Similarly, although not illustrated, the position comparison specification unit 332 determines for each candidate whether or not the position of the second moving object is present outside the observation region of the autonomous sensor 11 with the observation shielding being taken into consideration.

For a certain candidate, when determining that the position of the first moving object is present outside the observation region 2Z of the infrastructure sensor 2 with the observation shielding being taken into consideration, and that the position of the second moving object is present outside of the observation region of the autonomous sensor 11 with the observation shielding being taken into consideration, the position comparison specification unit 332 determines the compatibility of the candidate and maintains thereof. For a certain candidate, when determining that the position of the first moving object is present inside the observation region 2Z of the infrastructure sensor 2 with the observation shielding being taken into consideration, or that the position of the second moving object is present inside of the observation region of the autonomous sensor 11 with the observation shielding being taken into consideration, the position comparison specification unit 332 determines the incompatibility of the candidate and excludes thereof.

In the cases of the examples of the candidates of FIG. 10 and FIG. 11, the position comparison specification unit 332 maintains the candidate of FIG. 10 and excludes the candidate of FIG. 11. As a result, one candidate is specified; therefore, the position matching specification unit 332 outputs the candidate of FIG. 10 as the position information of the moving device 1.

<Operation>

Figure 12:
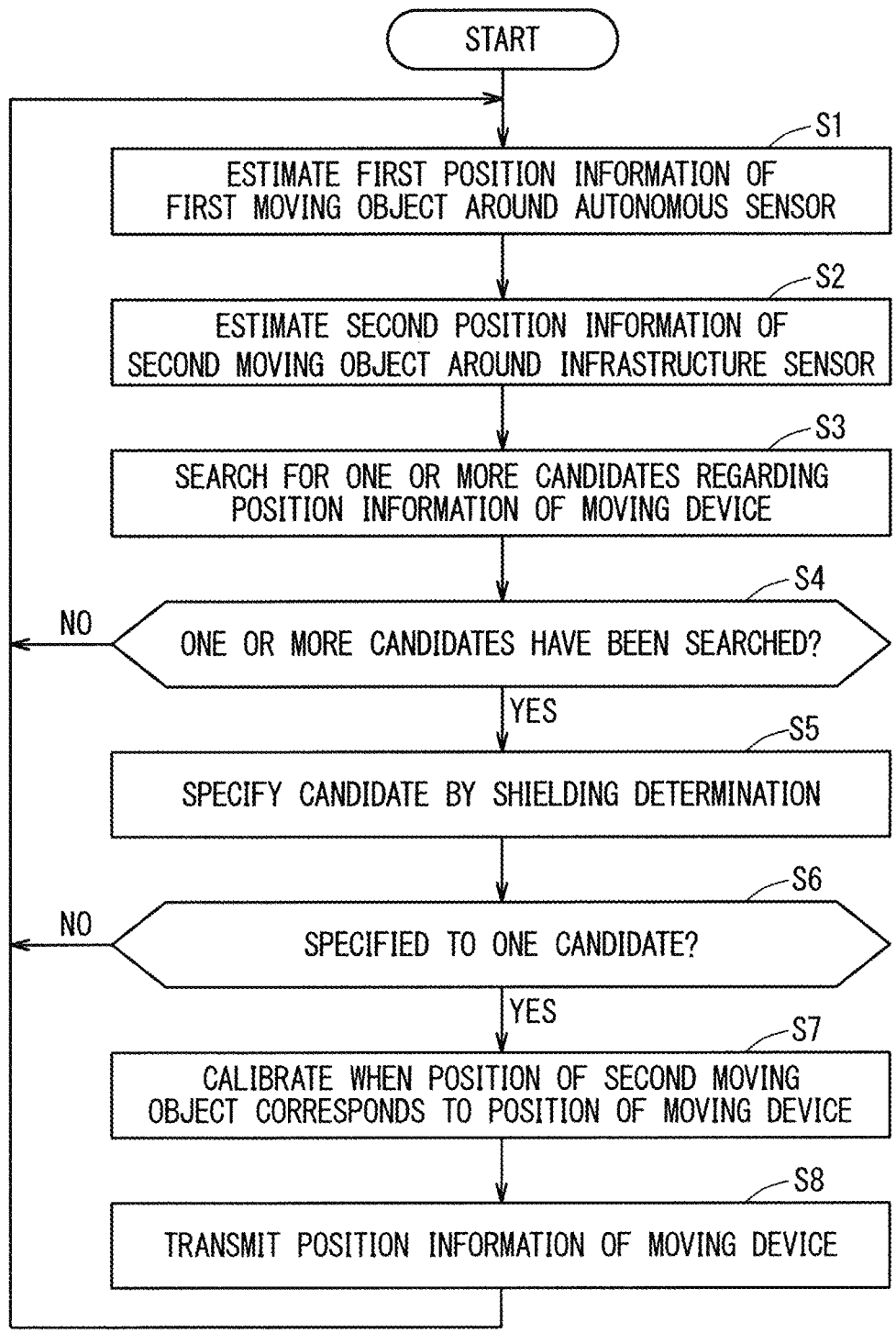
FIG. 12 A flowchart illustrating an operation of the information processing device according to Embodiment 1.

The operation of the information processing device 3 according to Embodiment 1 will be described with reference to FIG. 12. FIG. 12 is an example of a flowchart illustrating the operation of each units of the information processing device 3.

First, in Step S1, the mobile communication unit 30 is in a standby state for receiving the observation information from the moving device 1. After the mobile communication unit 30 receives the observation information from the moving device 1, the first moving object acquisition unit 31 estimates the first position information of the first moving object based on the observation information. When the estimation is completed, the process proceeds to Step S2.

In Step S2, after receiving the observation information from the infrastructure sensor 2, the second moving object acquisition unit 32 estimates the second position information of the second moving object based on the observation information. When the estimation is completed, the process proceeds to Step S3. The processes of Steps S1 and S2 may be performed in the reversed order or may be performed in parallel.

In Step S3, the position candidate search unit 331 searches for one or more candidates regarding the position information of the moving device 1 based on the first position information and the second position information estimated in Steps S1 and S2, respectively. When the search is completed, the process proceeds to Step S4.

In Step S4, the position comparison specification unit 332 determines whether or not one or more candidates have been searched by the position candidate search unit 331. When determined that one or more candidates have been searched, the process proceeds to Step S5, and when determined that no candidate has been searched, the process proceeds to Step S1.

In Step S5, the position comparison specification unit 332 performs a shielding determination on one or more candidates searched in Step S3, excludes candidates with incompatibility, and specifies the candidate. When the specification is completed, the process proceeds to Step S6.

In Step S6, the position comparison specification unit 332 determines whether or not one or more candidates have been specified to one candidate. When determined that one or more candidates have been specified to one candidate, the process proceeds to Step S7. Meanwhile, when determined that two or more candidates have been left, or that none of the candidates are left, the process proceeds to Step S1.

In Step S7, when determined that the position of any one of the second moving objects represented by the second position information estimated in Step S2 corresponds to the position represented by the position information of the moving device 1 specified in Step S5, the estimated position calibration unit 333 calibrates the position information of the moving device 1 using the position of the one second moving object. When the calibration is completed, the process proceeds to Step S8.

In Step S8, the mobile communication unit 30 transmits the position information of the moving device 1 after Step S7 to the moving device 1. When the transmission is completed, the process proceeds to Step S1.

Summary of Embodiment 1

As described above, according to Embodiment 1, the position information of the moving device 1 is estimated by comparing the positional relationship between the first moving objects around the moving device 1 and the second moving objects around the infrastructure sensor 2. According to such a configuration, the position information of the moving device 1 can be estimated even when the infrastructure sensor 2 cannot directly observe the moving device 1. This is particularly effective when the moving device 1 travels in an environment where there are many moving objects such as people.

The position information of the moving device 1 can be estimated even when the infrastructure sensor 2 cannot directly observe the moving device 1. Therefore, even when the moving device 1 is not present within the observation range of the infrastructure sensor 2, the position information of the moving device 1 can be estimated when the moving device 1 is close enough to some extent to the observation range of the infrastructure sensor 2. Therefore, a distance-wise improvement for the observation of the moving device 1 by the infrastructure sensor 2 is expected.

Further, even when a plurality of moving devices 1 are performing the same operation using the positions of the moving objects estimated based on the observation information generated by the autonomous sensors 11 of the moving devices 1, distinguishment and estimation of the position information of each of the moving devices 1 are ensured.

It should be noted that each function or each component of the information processing device 3 described above may be distributed and installed in the moving device 1 and the infrastructure sensor 2 for constructing the above system. For example, in the above description, the first moving object acquisition unit 31 and the second moving object acquisition unit 32 provided in the information processing device 3 may be provided in the moving device 1 and the infrastructure sensor 2, respectively. In this case, the information processing device 3 may be configured to receive the first position information estimated by the moving device 1 and the second position information estimated by the infrastructure sensor 2.

Further, if the infrastructure sensor 2 is provided outside the moving device 1, the information processing device 3 does not necessarily have to be installed outside the moving device 1, and may be provided in the moving device 1. In this case, the infrastructure sensor 2 may include a mobile communication unit that transmits the position information and the observation information of the infrastructure sensor 2 to the information processing device 3 provided in the moving device 1.

Embodiment 2

Figure 13:
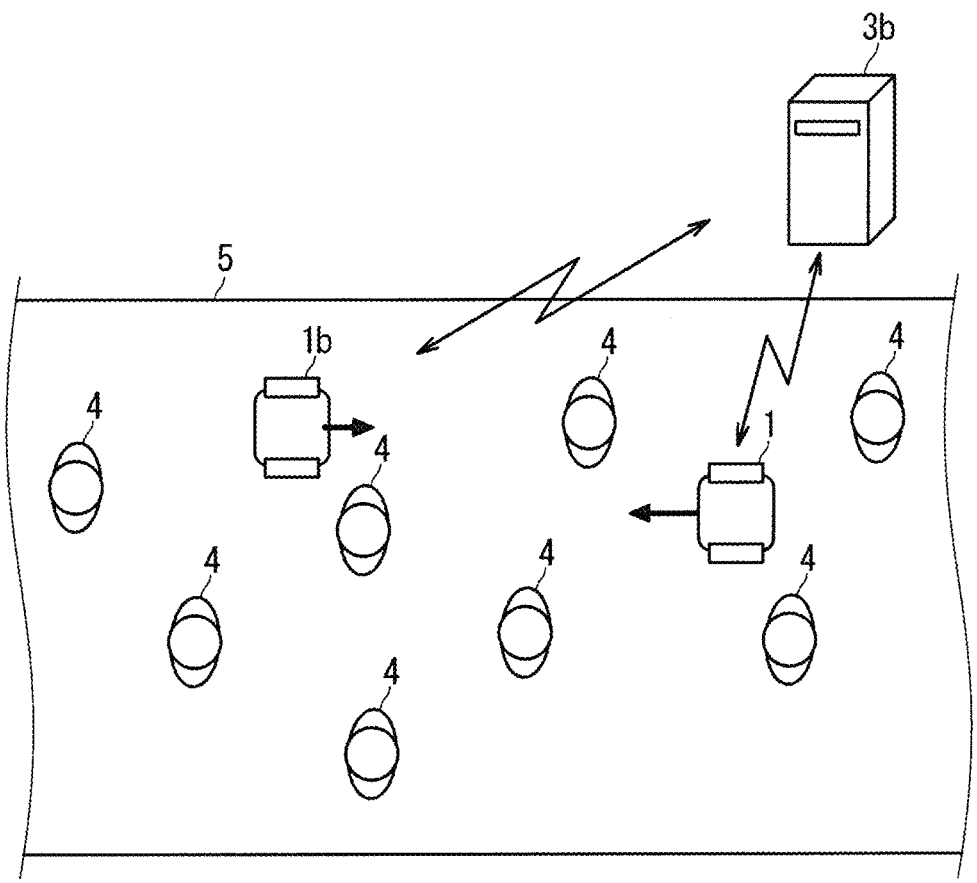
FIG. 13 A conceptual diagram illustrating an example of a system configuration according to Embodiment 2.

Hereinafter, Embodiment 2 of the present invention will be described with reference to the drawings. FIG. 13 is a conceptual diagram illustrating an example of a system configuration according to Embodiment 2. Hereunder, of the components to be described in Embodiment 2, components that are the same or similar to those described above are given correspondingly identical or similar reference characters, and the description is mainly made on the rest of the components.

In the system configuration of FIG. 13 according to Embodiment 2, a moving device 1b different from the moving device 1 and an information processing device 3b are provided instead of the infrastructure sensor 2 and the information processing device 3 of the system configuration of FIG. 1 according to Embodiment 1.

<Moving Device 1b>

Figure 14:
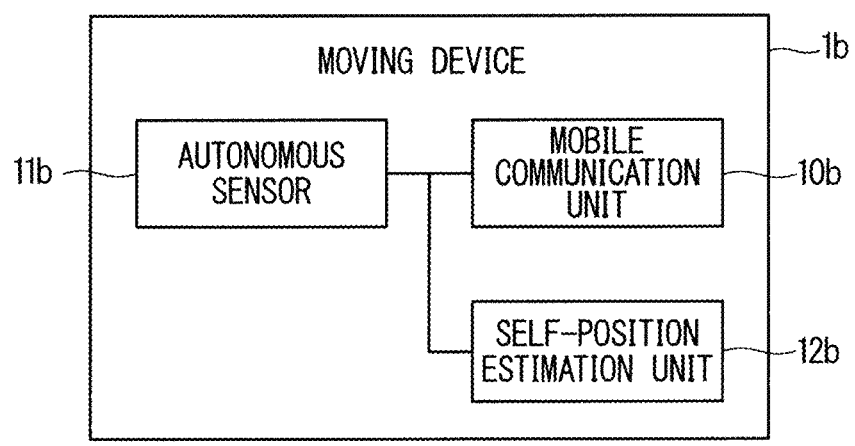
FIG. 14 A block diagram illustrating a configuration and functions of a moving device according to Embodiment 2.

The configuration of the moving device 1b according to Embodiment 2 will be described with reference to FIG. 14. FIG. 14 is a block diagram illustrating the configuration and functions of the moving device 1b.

The target to which the moving device 1b is applied is a robot or the like as in the moving device 1 according to Embodiment 1. The number of the moving devices 1b may be one or a plurality thereof may be acceptable.

The moving device 1b of FIG. 14 includes a mobile communication unit 10b, an autonomous sensor 11b, and a self-position estimation unit 12b. The other configuration of the moving device 1b may be the same as that of the moving device 1, only a part of the unit of the moving device 1 may be mounted, or a unit different from the moving device 1 may be added.

The mobile communication unit 10b is a communication unit for transmitting the observation information generated by the autonomous sensor 11b and the position information estimated by the self-position estimation unit 12b to the information processing device 3. It should be noted that, the mobile communication unit 10b may also transmit information other than the above information to the information processing device 3b and receive any information from the information processing device 3b. Further, the communication method of the mobile communication unit 10b may also be the same as that of the mobile communication unit 10 of FIG. 2, for example.

The autonomous sensor 11b is a sensor similar to the autonomous sensor 11 of FIG. 2, which is mounted on the moving device 1b, observes moving objects around the moving device 1b and thus around the autonomous sensor 11b and outputs the result as the observation information. The autonomous sensor 11b corresponds to a second sensor in the information processing device 3b. The moving objects observed by the autonomous sensor 11b are, for example, at least one of the moving device 1 and one or more moving objects 4 in FIG. 13. The autonomous sensor 11b includes a sensor used for self-position estimation of the self-position estimation unit 12b, and such a sensor includes the sensor exemplified in the autonomous sensor 11 of embodiment 1.

The self-position estimation unit 12b is a processing unit similar to the self-position estimation unit 12 of FIG. 2. The self-position estimation unit 12b generates the position information of the moving device 1b by estimating the self-position of the moving device 1b based on the observation information generated by the autonomous sensor 11b.

The position information generated by the self-position estimation unit 12b may include accuracy information related to the estimation of the position information. The accuracy information is an index indicating the accuracy of estimation of position information, and may be, for example, a quantitative value obtained by calculating an estimation error such as an error range or an error azimuth, a qualitative value derived from an estimation method such as dead reckoning or SLAM, or both values. In the following description, the accuracy of the position information indicated by the accuracy information may be referred to as position accuracy.

<Information Processing Device 3b>

Figure 15:
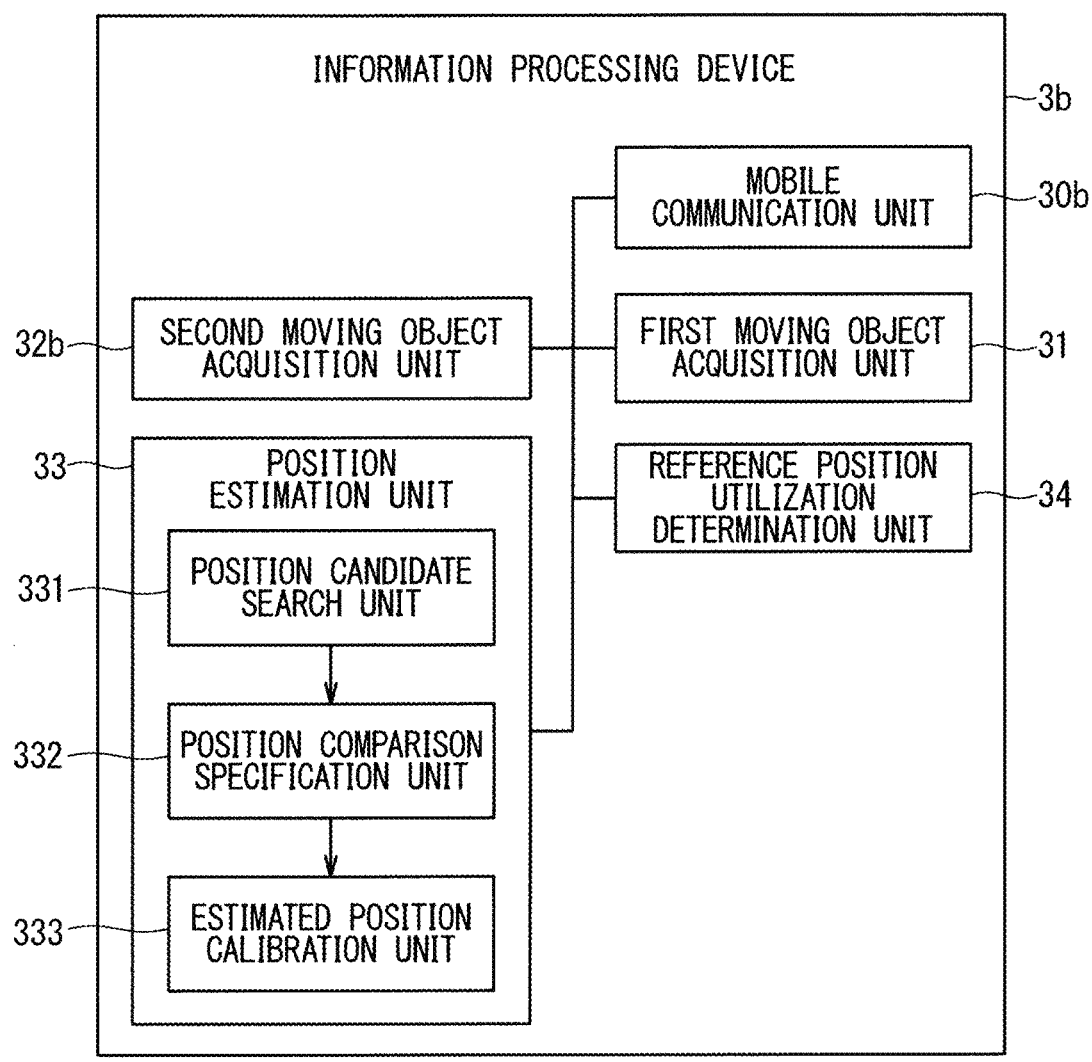
FIG. 15 A block diagram illustrating a configuration and functions of an information processing device according to Embodiment 2.

The configuration of the information processing device 3b according to Embodiment 2 will be described with reference to FIG. 15. FIG. 15 is a block diagram illustrating the configuration and functions of the information processing device 3b.

In the information processing device 3b of FIG. 15, a mobile communication unit 30b and a second moving object acquisition unit 32b are provided instead of the mobile communication unit 30 and the second moving object acquisition unit 32 of the information processing device 3 of FIG. 3, and a reference position utilization determination unit 34 is added. Although the details will be described later, the reference position utilization determination unit 34 determines whether or not second position information estimated by the second moving object acquisition unit 32b, that is, position information of one or more second moving objects around the moving device 1b is used by a position estimation unit 33b based on the position information of the moving device 1b. The second moving objects here, for example, are represented by at least one of the moving device 1 and the moving objects 4 in FIG. 13.

Next, the components of the information processing device 3b will be described in detail.

Similar to the mobile communication unit 30 of FIG. 3, the mobile communication unit 30b is a communication unit that receives observation information from the moving device 1 and transmits position information to the moving device 1. The mobile communication unit 30b is a communication unit that receives the observation information and the position information from the moving device 1b. It should be noted that, the mobile communication unit 30b may also transmit and receive information other than the above information. Further, the communication method of the mobile communication unit 30b may also be the same as that of the mobile communication unit 30 of FIG. 3, for example.

The second moving object acquisition unit 32 is a processing unit that detects one or more second moving objects present around the autonomous sensor 11b and thus around the moving device 1b and estimates absolute positions of the second moving objects based on the position information estimated by the moving device 1b and the observation information observed by the moving device 1b. And, the second moving object acquisition unit 32 is a processing unit that generates position information representing its estimation result, that is, second position information regarding the positions of one or more second moving objects present around the moving device 1b.

Note that the second position information generated by the second moving object acquisition unit 32b does not necessarily have to be absolute position information, as in the case of the second moving object acquisition unit 32 in FIG. 3, and the second position information need only be such position information that is convertible into the absolute position information of the second moving object by using the position information of the moving device 1b. Further, the method of estimating the second position information in the second moving object acquisition unit 32b may be the same as, for example, the first moving object acquisition unit 31.

The reference position utilization determination unit 34 is a processing unit that determines whether or not second position information of the second moving object acquisition unit 32b is used for the estimation of the position information of the moving device 1 by the position estimation unit 33 based on the position information of the moving device 1b estimated by the self-position estimation unit 12b of the moving device 1b.

As a first example, when the position information of the moving device 1b includes accuracy information, the reference position utilization determination unit 34 may determine whether or not to set the position of the moving device 1b as the reference point of the position information of the moving device 1 based on the accuracy information. As a second example, when the rough position information of the moving device 1 can be acquired, the reference position utilization determination unit 34 may determine whether or not to set the position of the moving device 1b as the reference point of the position information of the moving device 1 based on the position information.

Hereinafter, the first example in which accuracy information is included in the position information of the moving device 1b will be described. In the first example, the reference position utilization determination unit 34 performs determination of the amount of position error based on the accuracy information, or determination of the estimation method based on the accuracy information, or the like, in order to limit the position information of the moving device 1b used for the position estimation to the highly accurate position information.

Then, the reference position utilization determination unit 34 determines that the second position information estimated by the second moving object acquisition unit 32b is used by the position estimation unit 33 only when the position accuracy of the moving device 1b obtained in the determination result satisfies the preset position accuracy. Meanwhile, the reference position utilization determination unit 34 determines that the second position information estimated by the second moving object acquisition unit 32b is not used by the position estimation unit 33 when the position accuracy of the moving device 1b obtained in the above determination result does not satisfy the preset position accuracy. The position estimation unit 33 follows the determination result of the reference position utilization determination unit 34.

Next, the second example in which the reference position utilization determination unit 34 can acquire the rough position information of the moving device 1 will be described. In the second example, the reference position utilization determination unit 34 performs a distance determination based on the position information in order to limit the position information of the moving device 1b used for the position estimation to the position information indicating the vicinity of the moving device 1.

Then, the reference position utilization determination unit 34 determines that the second position information estimated by the second moving object acquisition unit 32b is used by the position estimation unit 33 only when the moving device 1b and the moving device 1 are determined to be present within a preset range. Meanwhile, the reference position utilization determination unit 34 determines that the second position information estimated by the second moving object acquisition unit 32b is not used by the position estimation unit 33 when the moving device 1b and the moving device 1 are determined not to be present within the preset range. The position estimation unit 33 follows the determination result of the reference position utilization determination unit 34.

It should be noted that, the reference position utilization determination unit 34 may always determine that the second position information estimated by the second moving object acquisition unit 32b is used by the position estimation unit 33 when the position information of the moving device 1b does not include the accuracy information and when the rough position information of the moving device 1 cannot be acquired.

Summary of Embodiment 2

As described above, according to Embodiment 2, the position information of the moving device 1 is estimated with reference to the moving device 1b whose position information is known. Therefore, even in a region where the infrastructure sensor 2 according to Embodiment 1 is not installed or the infrastructure sensor 2 cannot perform observation, the position information of the moving device 1 is estimated based on the position information of the other moving device 1b.

Further, when the position accuracy of the moving device 1b is low, for example, by the reference position utilization determination unit 34, the second position information estimated based on the observation information of the autonomous sensor 11b of the moving device 1b is not used by the position estimation unit 33; therefore, the information processing device 3b can estimate the accurate position information of the moving device 1.

When the first sensor and the second sensor are the same sensors, the first moving object acquisition unit 31 and the second moving object acquisition unit 32 or the second moving object acquisition unit 32b in the information processing device 3 of FIG. 3 or the information processing device 3b of FIG. 15 may be integrated into one common processing unit.

Further, each unit of the information processing device 3 or the information processing device 3b described in Embodiments may be a calculation process of the information processing method for estimating the position information of the moving device 1.

Further, each unit of the information processing device 3 or the information processing device 3b described in Embodiments may be realized as a function on the computer for estimating the position information of the moving device 1 by executing the program by the computer.

Further, the configuration of the information processing device 3 or the information processing device 3b described in Embodiments may be changed without departing from the scope of the invention. For example, the information processing device 3 or the information processing device 3b may be included in the moving device 1, or may be realized by a plurality of different devices.

The embodiments of the present invention can be combined, appropriately modified or omitted, without departing from the scope of the invention.

While the invention has been described in detail, the foregoing description is in all respects illustrative and not restrictive. It is understood that numerous other modifications and variations can be devised without departing from the scope of the invention.

EXPLANATION OF REFERENCE SIGNS

1, 1b moving device, 2 infrastructure sensor, 3 information processing device, 4A, 4B first moving object, 4X, 4Y second moving object, 11 autonomous sensor, 31 first moving object acquisition unit, 32 second moving object acquisition unit, 33 position estimation unit, 34 reference position utilization determination unit, 331 position candidate search unit, 332 position comparison specification unit, 333 estimated position calibration unit.

The invention claimed is:

1. An information processing device configured to estimate position information of a moving device, comprising:
   circuitry configured to:
   acquire first position information being relative position information of the moving device and one or more first moving object present around a first sensor based on observation information generated by the first sensor mounted on the moving device;
   acquire second position information being position information of one or more second moving object present around a second sensor based on observation information generated by the second sensor provided outside of the moving device; and
   estimate position information of the moving device by superposing the first position information and the second position information and using the first position information and the second position information with the one or more first moving object and the one or more second moving object superposing each other and forming a pair,
   wherein the moving device is configured to move to a destination based upon the position information.

2. The information processing device according to claim 1, wherein
   the circuitry is configured to estimate the position information of the moving device by superposing the position relationship of the one or more first moving object and the position relationship of the one or more second moving object based on the first position information and the second position information, and by performing a shielding determination that determines whether or not the one or more first moving object is shielded with the one or more second moving object with respect to the first sensor, or whether or not the one or more second moving object is shielded with the one or more first moving object with respect to the second sensor.

3. The information processing device according to claim 1, wherein the circuitry is configured to:
   search for one or more candidates regarding the position information of the moving device based on the first position information and the second position information,
   perform a shielding determination for each candidate, that determines whether the one or more first moving object is shielded with the one or more second moving object with respect to the first sensor or whether the one or more second moving object is shielded with the one or more first moving object with respect to the second sensor, and
   specify a candidate from the one or more candidates based on a result of the shielding determination.

4. The information processing device according to claim 3, wherein the circuitry is configured to search for one or more candidates regarding the position information of the moving device by superposing the position relationship of the one or more first moving object and the position relationship of the one or more second moving object.

5. The information processing device according to claim 3, wherein the circuitry is configured to perform the shielding determination by determining whether or not a moving object whose position information has been acquired by one sensor of the first sensor and the second sensor is present in a region in which, for another sensor of the first sensor and the second sensor, a moving object whose position information has been acquired by the other sensor is not shielded with another moving object whose position information has been acquired by the other sensor.

6. The information processing device according to claim 3, wherein the circuitry is circuitry configured, when a position of any one of the one or more second moving object represented by the second position information and the position represented by the position information of the moving device, to calibrate the position information of the moving device using the position of the one of the one or more second moving object.

7. The information processing device according to claim 1, wherein
the second sensor is mounted on another moving device, and
the circuitry is configured to determine whether or not the second position information is used based on the position information of the other moving device.

8. The information processing device according to claim 1, wherein the moving device is configured to autonomously move to the destination based upon the position information.

9. The information processing device according to claim 1, wherein
the information processing device is a part of a system, and
the system includes the moving device configured to move to the destination based upon the position information.

10. The information processing device according to claim 1, wherein
the information processing device is a part of a system, and
the system includes the moving device configured to autonomously move to the destination based upon the position information.

11. An information processing method for estimation of position information of a moving device, comprising:
acquiring first position information being relative position information of the moving device and one or more first moving object present around a first sensor based on observation information generated by the first sensor mounted on the moving device;
acquiring second position information being position information of one or more second moving object present around a second sensor based on observation information generated by the second sensor provided outside of the moving device; and
estimating position information of the moving device by superposing the acquired first position information and the acquired second position information and using the first position information and the second position information with the one or more first moving object and the one or more second moving object superposing each other and forming a pair,
wherein the moving device is configured to move to a destination based upon the position information.

12. The method according to claim 11, further comprising estimating the position information of the moving device by superposing the position relationship of the one or more first moving object and the position relationship of the one or more second moving object based on the first position information and the second position information, and by performing a shielding determination that determines whether or not the one or more first moving object is shielded with the one or more second moving object with respect to the first sensor, or whether or not the one or more second moving object is shielded with the one or more first moving object with respect to the second sensor.

13. The method according to claim 11, further comprising:
searching for one or more candidates regarding the position information of the moving device based on the first position information and the second position information,
performing a shielding determination for each candidate, that determines whether the one or more first moving object is shielded with the one or more second moving object with respect to the first sensor or whether the one or more second moving object is shielded with the one or more first moving object with respect to the second sensor, and
specifying a candidate from the one or more candidates based on a result of the shielding determination.

14. The method according to claim 13, further comprising searching for one or more candidates regarding the position information of the moving device by superposing the position relationship of the one or more first moving object and the position relationship of the one or more second moving object.

15. The method according to claim 13, further comprising performing the shielding determination by determining whether or not a moving object whose position information has been acquired by one sensor of the first sensor and the second sensor is present in a region in which, for another sensor of the first sensor and the second sensor, a moving object whose position information has been acquired by the other sensor is not shielded with another moving object whose position information has been acquired by the other sensor.

16. The method according to claim 13, further comprising, when a position of any one of the one or more second moving object represented by the second position information and the position represented by the position information of the moving device, calibrating the position information of the moving device using the position of the one of the one or more second moving object.

17. The method according to claim 11, wherein
the second sensor is mounted on another moving device, and
the method further comprises determining whether or not the second position information is used based on the position information of the other moving device.

18. A non-transitory computer-readable storage medium storing a program for estimation of position information of a moving device, the program causing a computer to perform a method, the method comprising:
acquiring first position information being relative position information of the moving device and one or more first moving object present around a first sensor based on observation information generated by the first sensor mounted on the moving device;
acquiring second position information being position information of one or more second moving object present around a second sensor based on observation information generated by the second sensor provided outside of the moving device; and
estimating position information of the moving device by superposing the acquired first position information and the acquired second position information and using the first position information and the second position information with the one or more first moving object and the one or more second moving object superposing each other and forming a pair, wherein the moving device is configured to move to a destination based upon the position information.

* * * * *